United States Patent
Lifshitz et al.

(10) Patent No.: US 9,679,344 B2
(45) Date of Patent: Jun. 13, 2017

(54) SERVER-BASED FAST REMOTE DISPLAY ON CLIENT DEVICES

(71) Applicant: Nubo Software, Airport City (IL)

(72) Inventors: Israel Lifshitz, Ganei Tlkva (IL); Ron Munitz, Holon (IL); Meir Shoam, Ramat Gan (IL)

( * ) Notice: Subject to any disclaimer, the term of this patent is extended or adjusted under 35 U.S.C. 154(b) by 0 days.

(21) Appl. No.: 14/062,343

(22) Filed: Oct. 24, 2013

(65) Prior Publication Data

US 2014/0111528 A1    Apr. 24, 2014

Related U.S. Application Data

(60) Provisional application No. 61/717,648, filed on Oct. 24, 2012.

(51) Int. Cl.
*G06T 1/20*    (2006.01)

(52) U.S. Cl.
CPC ..................................... *G06T 1/20* (2013.01)

(58) Field of Classification Search
CPC ....................................................... G06T 1/20
See application file for complete search history.

(56) References Cited

U.S. PATENT DOCUMENTS

| | | | |
|---|---|---|---|
| 6,407,822 B1* | 6/2002 | Ueda | G06K 15/00 358/1.15 |
| 7,400,328 B1* | 7/2008 | Ye et al. | 345/537 |
| 2006/0288306 A1* | 12/2006 | Mahajan et al. | 715/804 |
| 2011/0130951 A1* | 6/2011 | Lee | 701/200 |
| 2011/0157196 A1* | 6/2011 | Nave | A63F 13/12 345/522 |
| 2011/0213828 A1* | 9/2011 | Tsirkin et al. | 709/203 |
| 2011/0271200 A1* | 11/2011 | Kikkawa et al. | 715/744 |
| 2013/0132462 A1* | 5/2013 | Moorer | H04N 21/2343 709/203 |
| 2013/0275766 A1* | 10/2013 | Plainecassagne et al. | 713/189 |
| 2014/0358670 A1* | 12/2014 | Lefevre | 705/14.44 |

\* cited by examiner

*Primary Examiner* — Kee M Tung
*Assistant Examiner* — Grace Q Li
(74) *Attorney, Agent, or Firm* — Intrinsic Law Corp.

(57) ABSTRACT

A system and method for controlling a display on a client device such as a wireless communication device, e.g., a smartphone or similar device is presented. Aspects of the invention permit a more efficient and fast representation of the desired output onto the client's display including by caching certain display data on the client, temporarily and/or permanently, and transmitting only command and control level data from the server to the client for display of the cached display data.

11 Claims, 7 Drawing Sheets

```
[GATEWAY] (LOG:751) sendDrawCmd CmdCode: 10, cmd bytes=142, total bytes=117367
[GATEWAY] (LOG:752) sendDrawCmd CmdCode: 10, cmd bytes=142, total bytes=117509
[GATEWAY] (LOG:753) sendDrawCmd CmdCode: 10, cmd bytes=142, total bytes=117651
[GATEWAY] (LOG:754) sendDrawCmd CmdCode: 10, cmd bytes=142, total bytes=117793
[GATEWAY] (LOG:755) sendDrawCmd CmdCode: 10, cmd bytes=142, total bytes=117935
[GATEWAY] (LOG:756) sendDrawCmd CmdCode: 10, cmd bytes=142, total bytes=118077
[GATEWAY] (LOG:757) sendDrawCmd CmdCode: 10, cmd bytes=142, total bytes=118219
[GATEWAY] (LOG:758) sendDrawCmd CmdCode: 10, cmd bytes=142, total bytes=118361
[GATEWAY] (LOG:759) sendDrawCmd CmdCode: 10, cmd bytes=142, total bytes=118503
[GATEWAY] (LOG:760) sendDrawCmd CmdCode: 67, cmd bytes=175, total bytes=118678
```

Fig. 7

SERVER-BASED FAST REMOTE DISPLAY ON CLIENT DEVICES

RELATED APPLICATIONS

The present application is related to and claims priority under 35 USC §120 to U.S. Provisional Application No. 61/717,648 entitled "Cloud Server with Fast Remote Display on Client Computing Devices", filed on Oct. 24, 2012, which is hereby incorporated by reference.

TECHNICAL FIELD

The present disclosure generally relates to serving information from a server to client for efficient and fast display of the information on the client. The client can be a computing device, for example a mobile computing device or communication device.

BACKGROUND

It is known in the art to serve content, including text, graphics, multimedia or other pages in a variety of formats from a server to a client. It is also known that client devices can include display devices on which visual representations of information can be presented, and that the client devices usually include graphics hardware and software for rendering or generating the viewable display contents. A server can be employed to generate data, transmitted to a client over a communication network, which is then used to generate the viewable content on the client's display.

Some systems generate information at the server and rely on the client to generate the graphical content to be presented on its display. However, other systems allow a server to more directly control the contents of a client's display by generating the graphical information in graphic format at the server and delivering this graphic data to the client for presentation.

For example, the X Window (sometimes X11) framework, originating at MIT, provided a windowing system for bitmap display of information of a client terminal, said bitmap generated substantially by a server, although the client machine's hardware and software remained necessary to facilitate the physical transfer of viewable content to the client screen. FIG. 1 illustrates the prior art X Windows architecture 10 as publicly described at http://en.wikipedia.org/wiki/X-windows. The cited Web page is only mentioned as a descriptive aid, which may or may not in itself be prior art, but it describes its authors' opinion of the X Windows prior art, and like any Web page, it may not be accurate and it may be altered or removed from time to time by its provider. An example of a display output 20 resulting on a client computer, from the same public source is shown in FIG. 2. X Windows therefore allowed programmers to engage a toolbox to leverage the graphical user interface (GUI) building blocks on a client machine running some operating system (OS). The result aimed to replicate the behavior of local operation of the GUI applications in general and allowed a client user to interact with the applications using the usual client-based GUI interface methods.

Another more recent example of desktop virtualization technology was offered by Citrix Systems, Inc. in the context of software as a service (SaaS) and cloud computing environments. These applications allowed users to receive server-based data to virtually run applications on the client.

Other prior art provided streaming of display data to a client machine, but such systems are limited by the speed or bandwidth of the server-client communication link. Also, such systems are limited by the computing resources available to the client (or in some cases the server) which limit the number of windows, frames, pixels, or display data generally from being delivered to the client. Most difficult would be graphics-intensive applications requiring realtime delivery of high frame rates to the client over the communication link.

Despite the virtual desktop and remote access technologies known in the art, there remains a need to improve the effectiveness, efficiency and speed of applications that rely on server-client content provided over a network, especially for relatively small client devices like smartphones that have limited local resources and communication bandwidth and graphics capabilities. This disclosure addresses systems and methods for doing so.

SUMMARY

Aspects of the present invention are directed to a system and a method. An illustrative method includes steps allowing a client device such as a mobile communication device (e.g., a smartphone or similar device) to efficiently render graphical or visual information to its display unit so as to get the display into a desired state (presenting some desired information on the display in a desired form). The method includes storing in a memory or a cache a plurality of display data elements (drawable things, images, etc.) which once stored on the client device do not need to be obtained again from a server, unlike conventional video streaming virtual desktop applications. Also, draw commands instructing the way in which the display data are to be drawn can be efficiently formatted, packaged and cached in memory for use again and again as necessary. This all reduces dramatically the amount of data needed to be sent from a server to a client in a virtual desktop or remote screen control setting.

A system can include a server that keeps track of the needs of the client, which many clients can connect to over a communication link such as a network connection. The server tracks and logs the draw commands sent to the client device and the display data as well so as to only send the necessary information to a client during a connection session by way of a stream of data. The client for its part senses, e.g., from a user input to the device, what the future desired state of the client display should look like. This allows the client and the server to determine what if any new data is needed at the client. The system allows for logging of storage locations of the draw commands and display data so that blocks of the same can be addressably referenced. Pointers and memory location offset data can be used as a more efficient and faster way to identify existing cached information on the client device.

BRIEF DESCRIPTION OF THE DRAWINGS

For a fuller understanding of the nature and advantages of the present concepts, reference is made to the following detailed description of preferred embodiments and in connection with the accompanying drawings, in which:

FIG. 7 illustrates an exemplary summary log of draw commands.

DETAILED DESCRIPTION

Aspects of this disclosure are directed to server-client systems existing over a communication network, for example, in the interactions between servers and client devices communicating therewith in the context of cloud platforms and applications. More particularly, the present systems and methods can be implemented in mobile or personal communication and computing devices such as tablets, smartphones and the like.

As mentioned above, typical personal communication or computing devices suffer from a limited communication bandwidth as well as limited computing resources. The limited computing resources may include limited graphics processing and limited storage (memory) resources as well as limited communication resources. Therefore, in modern systems, there may not be sufficient communication or computing resources in a connected device to allow it to quickly receive and render graphical information on a display in the device. This is especially true for graphics-intensive applications such as games and mapping and similar applications where the client device and/or the server must generate and deliver and render large amounts of display data for the client device. The end result of such limitations are a degraded user experience, which can at a minimum detract from the user's satisfaction with the device or application, and at worst can result in the device being unable to execute the needed steps to generate the graphical output required, including crashing or freezing or causing other symptoms of inoperability of the client or the server-client systems.

Embodiments of the present disclosure permit the operation of relatively limited client devices so that they can give the rich experience of a client machine with fuller communication and/or computing capabilities. In some aspects, the present disclosure permits a fast virtual desktop experience not possible using conventional techniques. As described above, where conventional systems required the delivery of display data at a given frame rate that was potentially costly or unsupportable, this disclosure relieves this situation by proper control and management of display data in and between the server and the client.

Figure 1:
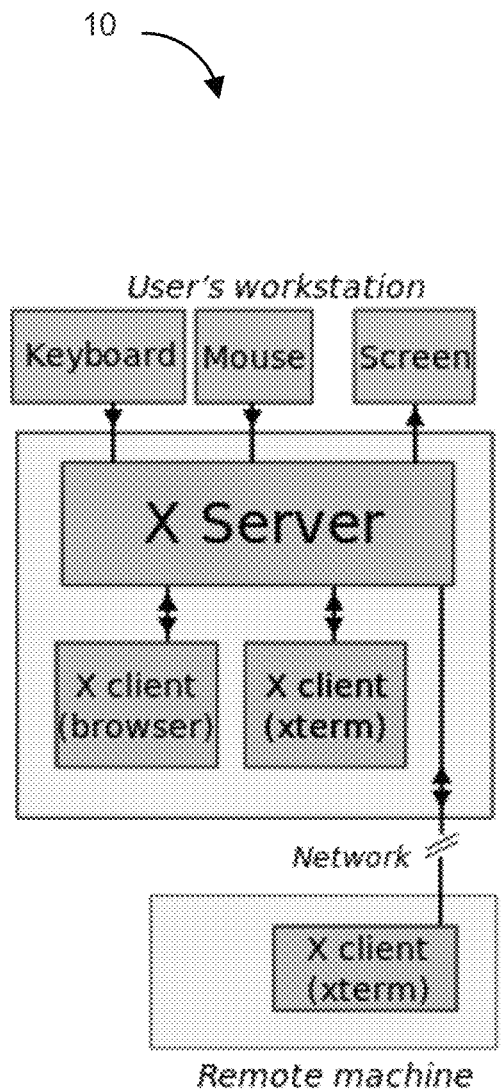
FIGS. 1 and 2 illustrate an exemplary architecture and GUI output, respectively, using a system (X Windows) for generating graphical output on a client computer according to the prior art.
Figure 2:
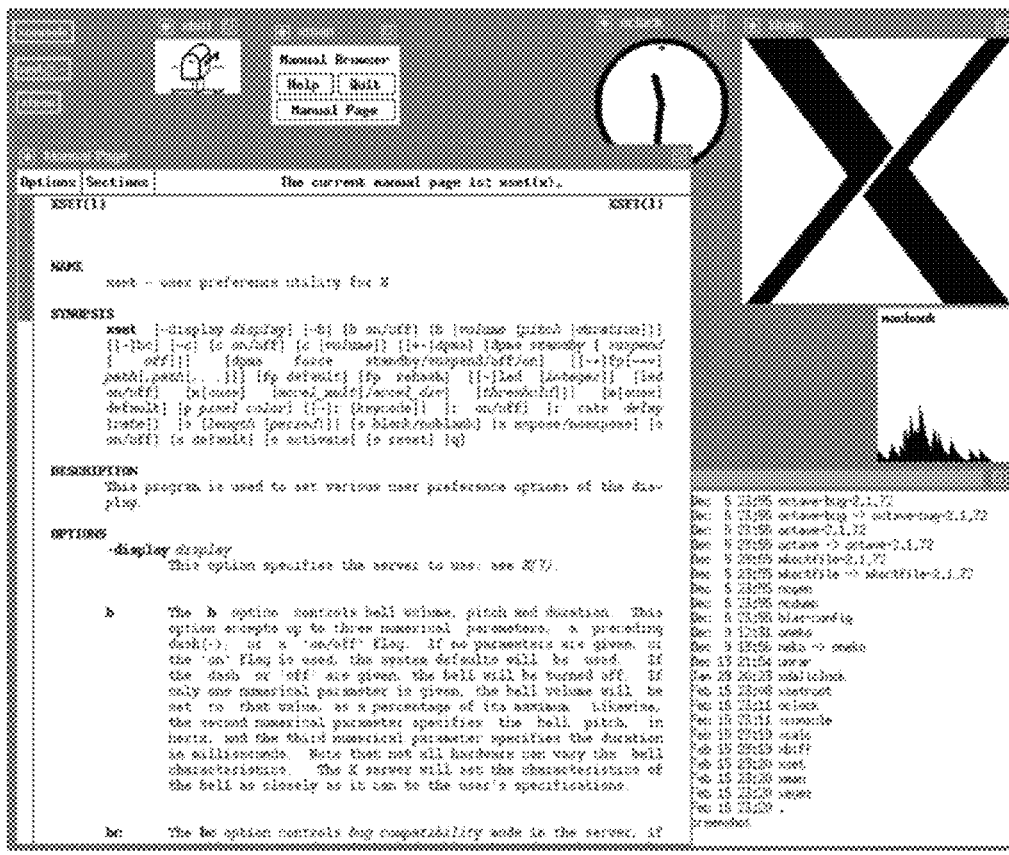
Figure 3:
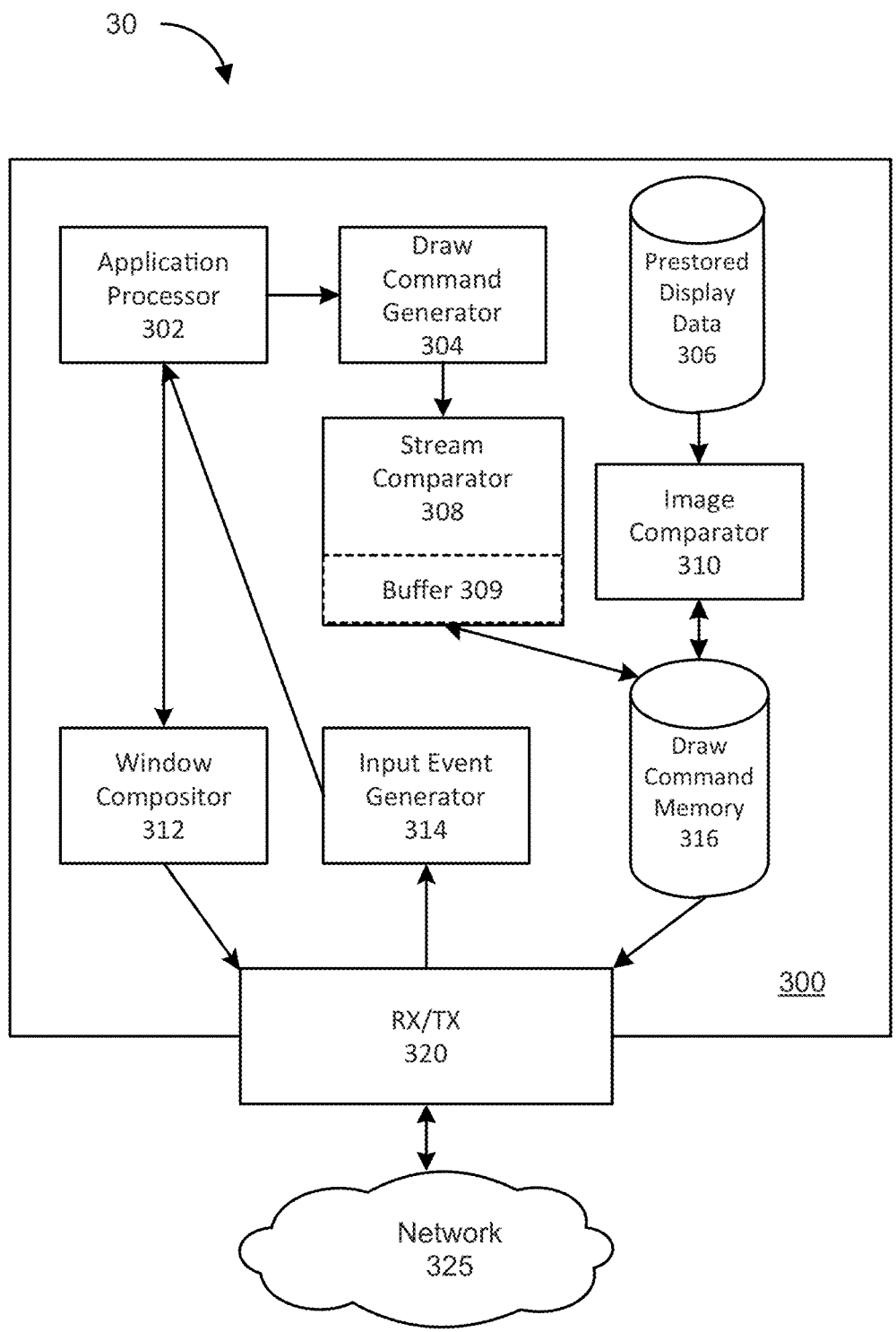
FIG. 3 illustrates an exemplary block diagram of a network-connected server.

FIG. 3 illustrates a block diagram of an architecture 30 for use in some embodiments of the present system and method. The figure shows the server 300 side of things, while the server 300 is connectable through a network 325 to client devices, shown in the following figure.

Server 300 includes an application processor 302, which can take on many forms in practice. The processor 302 can be a monolithic integrated circuit (IC) processor device with a processor core and auxiliary functions including on-chip memory, cache, controllers, power management, buswork and other features. Also, the functionality of application processor 302 can be distributed among more than one physical component interacting over an internal or external signal communication pathway such as a digital signaling bus or multi-bit bus system. The processor 302 is capable of taking and interpreting or executing instructions and instruction sets as necessary. It can support the running of an operating system on server 300 and also execute application programs and generally control the operation of server 300. This processor can be merely a process sufficiently enabled for the present functionality in a greater circuit or computer hardware component without loss of generality.

As mentioned above, server 300 is connectable to a network 325, e.g. a LAN, WAN, or the Internet through a receive/transmit (RX/TX) connection 320 or other suitable network connection plug. Various information such as control and signaling communication data and payload data can be exchanged through RX/TX connection 320. The communication may be packetized in common communication protocol packets including header and payload bits, and the physical format can be in any acceptable form including hard-wired or wireless communication formats.

The server receives input event data over the communication links to an input event generator 314. This interprets the intentions or inputs of a user of a client device in communication with server 300. For example, this module determines if the client device is executing a user interface process such as clicking, touching, dragging, swiping or another touch-based, visual or audible input from a user. The output of the input event generator 314 is used by the application processor 302 to determine what data is needed by the connected client device.

Application processor 302 provides signals to draw command generator 304 so as to generate data to provide the client device with virtual events displayed on the client. The input event generator 314 also receives information from the connected client device through connection 320 and aids the system to generate activity corresponding to the needs of the user of the client device in cooperation with sensors on the client device that sense the needs and actions of the client device's user.

Draw command generator 304 generates instructions in a format usable for controlling the display activity at a connected client device. The draw commands are generated responsive to signals received by draw command generator 304 from application processor 302 and other factors as described herein.

A prestored display data storage unit 306 is included on or associated with server 300 and holds display data for use by the connected client device. The display data may be graphical in nature or alphanumeric or in any format suitable for transmission to the client device to achieve a display thereon. Also, the display data may be compressed or reformatted or contain a shortcut or abbreviation or other digital representation corresponding to a displayable thing. The physical configuration of the device on which the display data are stored can vary, but it is typically a computer-readable memory device, and may have primary and secondary or optimized storage layouts to improve its performance.

Draw commands generated by draw command generator 304 are stored in draw command memory 316, which can physically be in a same or separate data storage unit than the others discussed herein. Draw commands include machine-readable or human-readable commands encoding what and how to display the display data on the connected client device. Draw commands can be delivered from the draw command memory 316 over the network 325 to connected client devices. Examples of draw commands are given below as illustrations of how the server and client device work together to maximize the speed and efficiency of the transfer of data between them to generate the desired client display.

Other components residing on server 300 include an image comparator 310 to assess the existence and redundancy of image data and avoid re-transmission of the same. Image comparator 310 will compare images to be sent to a client device with the contents of the prestored display data in memory 306. If a match is found, it will try to locate this image in the draw command memory 316. If it finds a match, it will replace image data with a special draw command (e.g. 97) and a prestored image identifier. The special command will indicate that a prestored image was found.

A window compositor 312 acts to control and compose windows in graphical user interface screens presented on a client device display.

A stream comparator 308 is used to determine what information needs to be carried in the draw command and display data streams being sent from the server to the client device. Older commands will be stored in draw command memory 316. The stream of new draw commands is provided to the stream comparator 308. In an embodiment, new instructions entered to the comparator 308 are compared with the old commands stored in memory 316. If a match of both the command code and data is found, then a pointer with the address different from the matched command will be generated. For example, if there is a command 560 and a match to command 42 is found, the difference is 518. A special command code will then be generated (this will be an unused code) for example 99, and it will indicate that a matched command was found. Therefore, if the original instruction had command code 10 with 142 bytes of data, command 99 with a value of 518 will be entered, and hence 3 bytes will be used instead of 143.

In another embodiment, the stream comparator 308 may contain a buffer 309 holding a certain number of draw commands, for example eight (8) draw commands. When a draw command reaches the end of buffer 309, the comparator 308 will check for a match for a block of eight draw commands. If there is no match the comparator will check for a match for seven draw commands and so on, until only one draw command is being compared. Where a match of more than one draw command is found, the difference value is generated and stored as a special command code, the difference value and the number of commands. The special command code (e.g. 98) will indicate that a matched instruction sequence was found. In our example, it will store 98, 518 and 4. These will be 4 bytes instead of 570 bytes. The new command will replace the sequence of commands (e.g. 4 commands) for which the match was found. In a connected client device, a similar draw command memory is kept, as will be explained below, and a client device command interpreter will recognize that this is a special instruction and will fetch from its own draw command memory the appropriate draw command sequence.

In another embodiment, the stream comparator 308 will also search for data embedded in the draw commands, e.g. for a text box, and will search for the same data in the prestored display data memory 306. Then, instead of delivering a copy of the found display data a special command code is inserted into the stream indicative of the distance from the matched data and the data length in bytes. Display data typically has a screen location identifier, which will be unique to each instance of this data (e.g., a text box). The stream comparator 308 can therefore identify the unique portion and generate an indication on the portions with the same data.

It should be understood that the components shown and described can be reconfigured by those skilled in the art according to their needs. That is, some of the described components may be functionally grouped or further split up. Also, these units may be located in separate places associated with or accessible by server 300, or may be co-located on the server itself as shown for simplicity. Finally, these things may be designed to use hardware, firmware or software to varying extents, and those skilled in the art can appreciate the ability to shift some functions for example between hardware and software without loss of generality.

Figure 4:
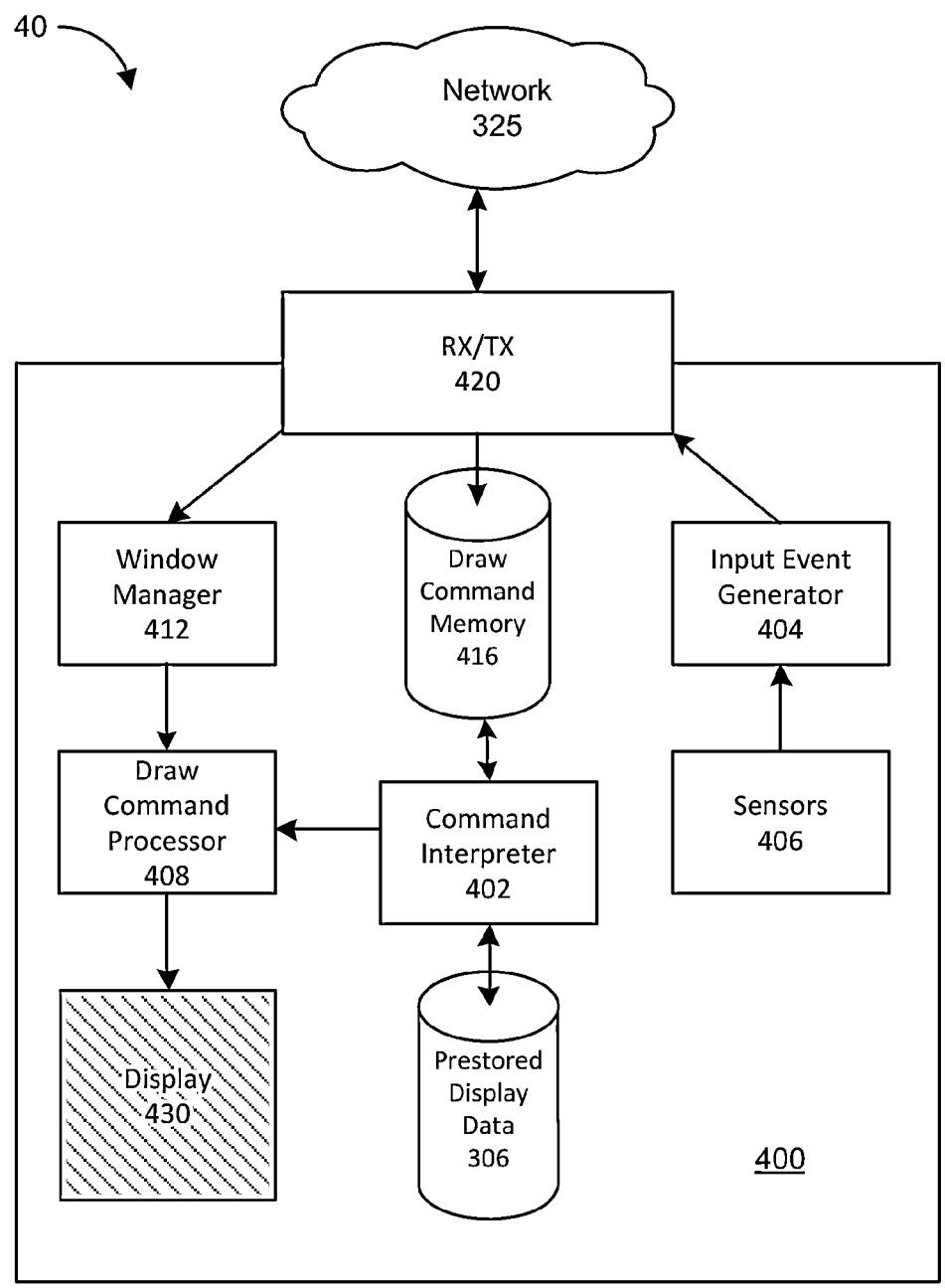
FIG. 4 illustrates an exemplary block diagram of a network-connected client with a display.

FIG. 4 illustrates an exemplary architecture 40 of a connected client device 400 with blocks representing components or functional units for operation according to the present disclosure. The client device 400 may be any computing device suitable for the present purpose. Examples are portable electronic devices, communication devices, tablets, smartphones, personal digital assistants, e-reader devices, navigation units, music players, and so on.

Client device 400 typically includes several computing resources as known generally in the field. For example, whether or not discussed in detail here, client device 400 may contain one or more processors for executing machine-readable instructions, one or more digital data storage units, cache memories, network connectivity, and a display unit.

Client device 400 is coupled by a receive/transmit connection 420 to network 325, which may be the aforementioned LAN, WAN, Internet, or other wired or wireless network. Client device 400 receives draw commands from the server 300 over network 325 and these are deposited in draw command memory 416. Also, display data and images and graphical content and files are received and stored in prestored display data unit 306.

Command interpreter 402 interprets the received draw commands and delivers an output to draw command processor 408, which can be implemented in a processing circuit. The draw command processor 408 may carry out executable or interpreted instructions. Draw command processor 408 also receives input from a window manager 412 to control the behavior of one or more graphical windows to be displayed on display 430.

Display 430 may be any of a number of display types, usually integrated into the body of a mobile or personal device such as a smart phone, but those skilled in the art understand that this can be generalized beyond the present examples. The display 430 may comprise a liquid crystal display (LCD) panel, a light emitting diode (LED) display, plasma display, cathode ray tube (CRT) display, e-ink display, or any other kind of display suitable for a given purpose.

As known to those skilled in the art, display devices typically comprise rows and columns of addressable picture elements (pixels) that are illuminated by display specific driving signals. The driving signals are delivered to the appropriate color and address of respective pixels to cause the overall display to present the desired content. The display 430 is usually refreshed at some refresh frame rate, and can therefore also provide the notion of animation or movement of an image such as a video segment. The import of this is not necessarily in the specific design of a given display, as the present disclosure can be generalized to any kind of display. Rather, that the draw command processor 408 or equivalent graphics hardware and software (usually integrated in an operating system on the device) put up one or more windows of content that are managed by window manager 412 and draw command processor 408. Various GUI elements, graphical elements and drawing primitives can be placed onto display 430. The client device and its operating system may come with a number of such drawing methods, elements and primitives already loaded thereon. These are rendered among the other display data from prestored display data unit 306.

It is worth repeating that the draw commands and the display data are put into local cache memory in the client device according to an aspect. So if a graphical element (e.g., a picture or an icon) is to be reused on the client to draw this same element to the client's display, there is no need to re-send this from the server to the client device, which consumes too much communication and computing resources. The client can sort and prioritize how and what it places into cache to achieve maximum performance gains. In an aspect, more commonly used data is placed in the fastest most readily accessible cache. In another aspect, the fastest most recently used data is cached in the most readily accessible cache. In yet another aspect the server 300 can inform the client 400 through some control command which data to place into its cache.

The server and the client architectures 30 and 40 shown in FIGS. 3 and 4 respectively are connected over some network 325 as mentioned above. The server 300 may act to support a number of clients 400, not just one. The server 300 may thus be a multi-processor or multi-threaded machine with instances running thereon to support a scalable architecture as described herein. The present system and method can support different types of client devices and different operating systems on the clients. There are known interfaces and tools allowing the server 300 to generically deliver display data and draw command data to the clients, and the clients are then able to transform or interpret the commands, e.g., in command interpreter 402 to suit their specific configurations.

The following instructions encode a series of commands to be generated by server 300 and interpreted for display in client device 400. Many other such commands and parameters therefor are possible and can be created by the programmer according to the present method. This example is therefore only given for the sake of illustration:

```
'bytesCount' : 71,
'processId' : 18311,
'cmdcode' : 16,
'cmdName' : 'setDensity',
'wndId' : -1625598408,
'bm' : {
    'canRead' : true,
    'bounds' : {
        'canRead' : true,
        'isNull' : false,
        'left' : 636,
        'top' : 17,
        'right' : 760,
        'bottom' : 141 },
    'matrix' : {
        'canRead' : true,
        'isNull' : false,
        'arr' : [ 1,0,0,0,1,0,0,0,1 ] } },
'density' : 132
```

It is noted that a group of commands such as those given above may be generated and delivered to the client device in bulk or as a set of instructions relating to one another. Here, the draw commands include a "bytesCount" command indicative of a number of bytes carried in the command. A "processId" identifies a connection process with which the command is associated. A command code can be given by its "cmdcode". The command may also have a common name "cmdName", and many other commands. The ones shown are, again, only exemplary for a type of operation being carried out by the systems.

It is also noted that a "matrix" can be included in the draw command set. The matrix carries information about the attributes of an object. For example, "canRead" or "isNull" (which may have Boolean values), or an array "arr" of attributes or parameters or arguments as well.

Another exemplary set of draw command instructions is shown below, which illustrates the flexibility of the present method and system, which lends itself to scripting of this nature as necessary to communicate to the client device how and what to present on the client device display.

```
'bytesCount' : 107,
'processId' : 18311,
'cmdcode' : 6,
'cmdName' : 'drawText1',
'wndId' : -1625598408,
'bm' : {
    'canRead' : true,
    'bounds' : {
        'canRead' : true,
        'isNull' : false,
        'left' : -2,
        'top' : -65,
        'right' : 102,
        'bottom' : 49 },
    'matrix' : {
        'canRead' : true,
        'isNull' : false,
        'arr' : [ 1,0,648,0,1,92,0,0,1 ] } },
'text' : 'Settings',
'start' : 0,
'x' : 28,
'y' : 13,
'paint' : {
    'flags' : 257,
    'antiAlias' : true,
    'filterBitmap' : false,
    'dither' : false,
    'underlineText' : false,
    'strikeThruText' : false,
    'fakeBoldText' : false,
    'linearText' : false,
    'subpixelText' : false,
    'style' : 0,
    'strokeCap' : 0,
    'strokeJoin' : 0,
    'textAlign' : 0,
    'hinting' : 1,
    'pdMode' : 31,
    'textSize' : 12,
    'strokeWidth' : 0,
    'color' : 16777215,
    'alpha' : 255,
    'textScaleX' : 1,
    'textSkewX' : 0 }
```

It is noted that the commands can include instructions regarding the placement of a graphic or drawn object, as well as its drawing style, font selection, color, as well as other information.

A log may be kept on the server or at another place which tracks the display commands sent to the client device, including the command codes, bytes of information contained in the command and/or payload, and so on. An exemplary log of such transmitted commands is presented below merely as an example of course. Those skilled in the art would appreciate the significance of such logs for example in tracking performance metrics of the system or other aspects of its operation, billing, user behavior, and so on.

Figure 5:
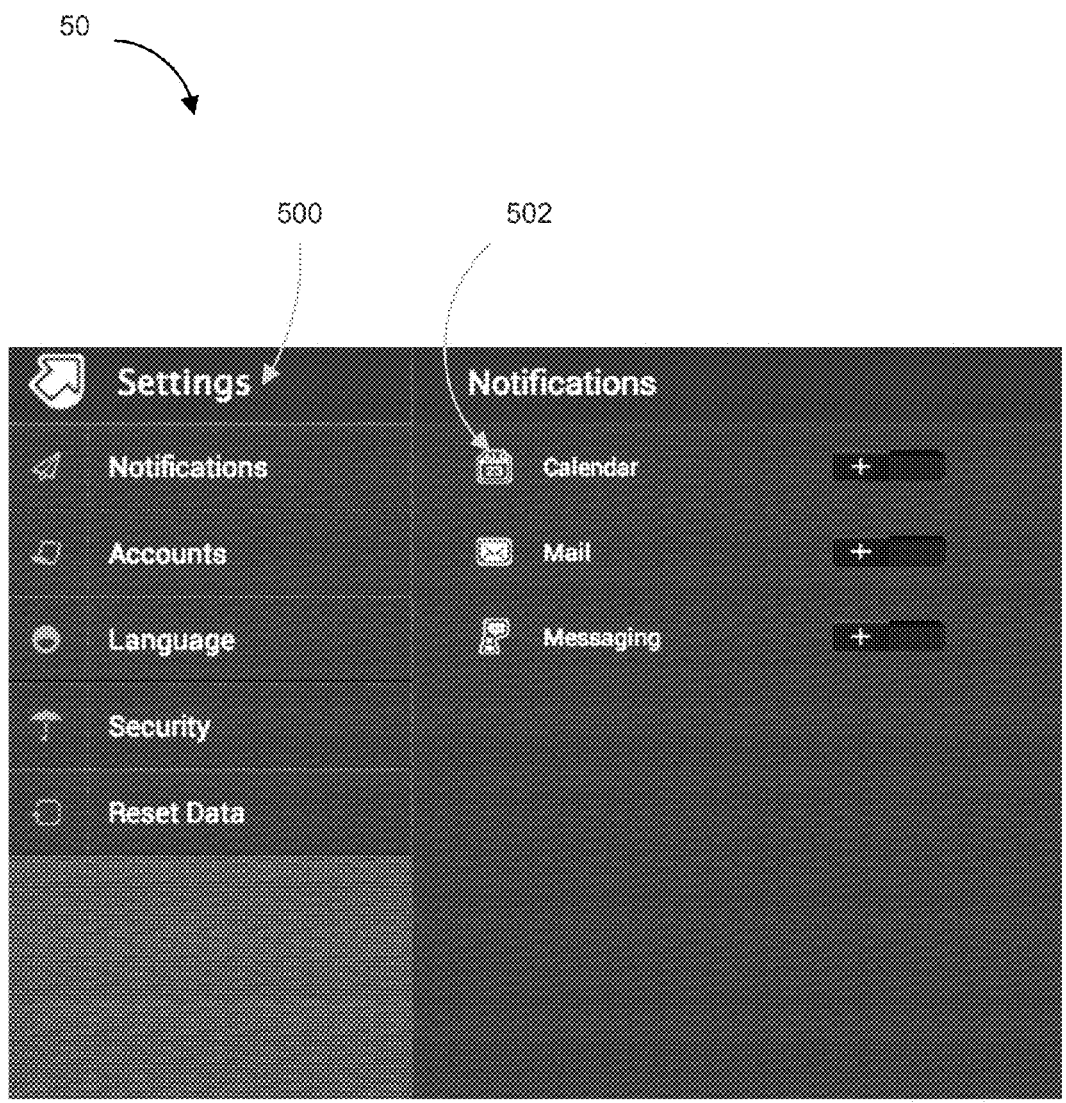
FIGS. 5 and 6 illustrate exemplary display states of some application virtually presented on the client device.

FIG. 5 illustrates an exemplary display of a virtual desktop space 50 on a client device according to this disclosure. A number of divided areas can be assigned on the overall area of the display 430 or windows thereof. For example, an application such as a to-do list application can be running on the server 300 and can cause the delivery of display data and draw commands to the client device to show the output seen in FIG. 5. Text characters 500 can be displayed at given places and in given ways on the screen. Icons, pictures or other graphical information 502 can be displayed and arranged on the display screen as well.

Figure 6:
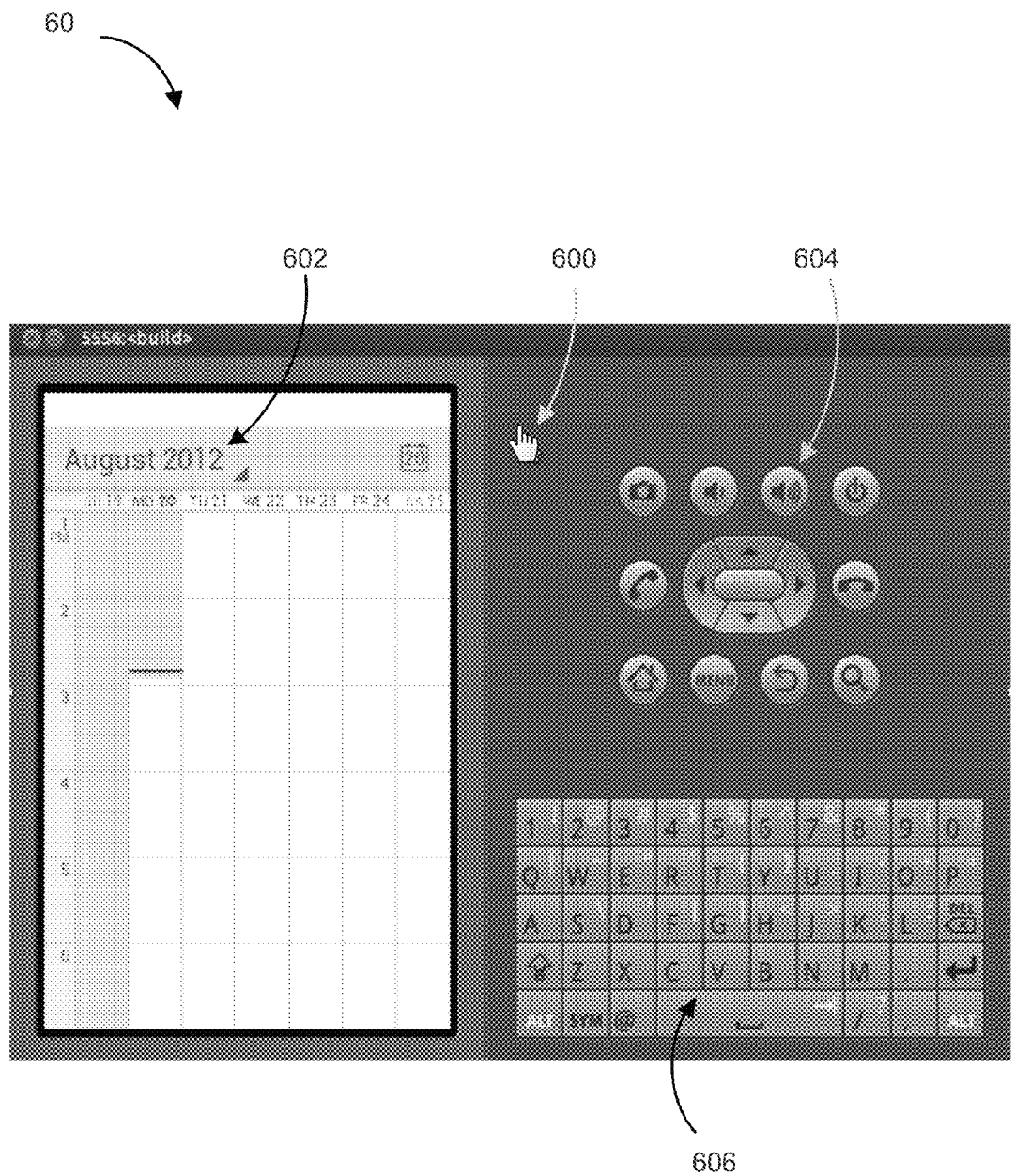

FIG. 6 illustrates another exemplary display output 60 on a client device. A GUI in a window allows a user though a cursor 600 or using other input methods such as touch, voice or gestures to interact with the client device through its screen. A calendar application shown here displays numbers and graphical elements 602 as desired, and offers interactive virtual buttons and GUI features 604, an interactive virtual keyboard 606, and so on. The user can interact with the virtual desktop 60 and cause the application to behave as if it were running locally on the client device. Sensors 406, shown in FIG. 4, take the input from the user such as touch inputs or audio command inputs. The sensors 406 cause input event generator 404 to encode the user's inputs in a way that can be sent in real time to the server 300 over network 325. In an exemplary implementation, the total bandwidth required to transfer the draw commands for displaying the screen of FIG. 6 is around 120 kB, which represents a five-fold speedup from what would be required to send this graphical output from the server to the client device conventionally using image streaming techniques.

FIG. 7 illustrates an exemplary summary or log of a stream of draw commands 70. These do not show the full payloads of the streaming packets, but are indicative of the continuing delivery of commands from the server to the connected client device so as to achieve the present goals.

In some aspects, the present system and methods speed up virtual desktop and remote display capabilities in server-client architectures. Of course, the discussion herein framing the delivery and receipt of draw commands and display data as server-client like is not meant to limit the overall disclosure in that any two properly configured machines can exchange information and data as described to achieve this goal. So the nature of the machines and the specifics of their connection as well as the nature of the Of course the above examples are provided as examples of the operation and construction of the system and method of the invention. Many of the exemplary features of these embodiments can be revised or alternates chosen to achieve a same or equivalent end. Therefore, the invention is not limited by the above examples, and those skilled in the art are expected to find custom implementations and extensions of this disclosure suiting their applications and ends along these lines, all of which are comprehended by the following claims.

The invention claimed is:

1. A method for controlling a display of a client device, comprising:
   in a server coupled to said client device by a communication link:
      determining a desired display state of said display including determining image data needed to achieve said desired display state;
      determining whether said desired display state requires image data that does not exist in said client device;
      transmitting to said client device said required image data that does not exist in said client device;
      if said image data exists in said client device, transmitting to said client device a first special draw command and a pre-stored image identifier, the pre-stored image identifier identifying the image data stored on said client device, the first special draw command indicating that said image data exists in said client device;
      determining whether said desired display state requires a sequence of draw commands that does not exist in said client device;
      transmitting to said client device said sequence of draw commands that does not exist in said client device from said server over said communication link, said sequence of draw commands containing instructions for configuring said display of the client device,
      wherein said client device configures said display according to at least said received draw commands using at least said received image data so as to achieve the desired display state.

2. The method of claim 1, further comprising transmitting an input event signal from said client device to said server over said communication link, said input event signal corresponding to a future desired display state of said client device, said future desired display state based on an input of a user of said client device.

3. The method of claim 1, further comprising, at said server, determining whether a required image data has been previously delivered to said client device, and if so, sending an abbreviated code to said client device, the abbreviated code representing a sequence of draw commands stored in a memory location in said image data storage location of said client device.

4. The method of claim 1, further comprising storing at least a subset of said draw commands at given addressable locations in a memory unit in said server.

5. The method of claim 4, further comprising calculating an offset from said given addressable locations and providing said offset to said client device for retrieval of a block of one or more stored draw commands or image data.

6. The method of claim 1, wherein if at least a portion of said sequence of draw commands exists in said client device, transmitting to said client device a second special draw command indicating that said portion of said sequence of draw commands is stored on said client device, a length of said portion of said sequence of draw commands stored on said client device, and a difference value that indicates a difference between said portion of said sequence of draw commands stored on said client device and a second portion of said sequence of draw commands that does not exist on said client device.

7. A server system comprising:
   a processor;
   a communication link interface coupling said server to a connected client device;
   a data storage unit including a location storing pre-stored image data identifiers of pre-stored images already sent from said server system to said client device;
   a data storage unit including a location storing preexisting draw commands already sent from said server system to said client device;
   an input event generator for handling input event signals from said client device;
   a draw command generator for generating new draw commands;
   a stream comparator for determining whether said new draw commands are required to be sent to said client device, said stream comparator comparing said new draw commands with said preexisting draw commands; and
   an image comparator for determining whether new image data for each new image is required to be sent to said client device, said image comparator comparing said new images with said pre-stored images;

a window compositor for managing at least one window's behavior at said client device, wherein said server system sends an abbreviated code to said client device if said stream comparator determines that a sequence of said new draw commands has already been delivered from said server system to said client device, said abbreviated code representing a corresponding sequence of said preexisting draw commands stored in a memory location in a display data storage location of said client device, said abbreviated code comprising a lower volume of data than said new draw commands, and wherein said server system sends said pre-stored image data identifier and a special draw command indicating said new image has already been delivered from said server system to said client device, if said image comparator determines that said new image has already been delivered from said server system to said client device.

8. The system of claim 7, further comprising a buffer of said stream comparator.

9. The system of claim 7, further comprising a cache memory unit in said data storage unit.

10. The system of claim 7, wherein said abbreviated code includes a pointer to at least one of said preexisting draw commands.

11. The system of claim 7, wherein said stream comparator searches for data embedded in said new draw commands and for data embedded in said pre-stored images, and wherein said server system inserts a special command code indicative of a distance from a matched data and a data length of said matched data if said stream comparator determines that said data embedded in one of said new draw commands matches said data embedded in one of said pre-stored images.

* * * * *